United States Patent
Minamide

(10) Patent No.: US 10,972,619 B2
(45) Date of Patent: Apr. 6, 2021

(54) DISPLAY APPARATUS FOR DISPLAYING POP-UP WINDOW AT APPROPRIATE DISPLAY POSITION ON SCREEN OF DISPLAY DEVICE, AND COMPUTER-READABLE NON-TRANSITORY RECORDING MEDIUM STORING DISPLAY CONTROL PROGRAM

(71) Applicant: KYOCERA Document Solutions Inc., Osaka (JP)

(72) Inventor: Hayato Minamide, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/709,131

(22) Filed: Dec. 10, 2019

(65) Prior Publication Data

US 2020/0220991 A1  Jul. 9, 2020

(30) Foreign Application Priority Data

Jan. 8, 2019 (JP) .............................. JP2019-001325

(51) Int. Cl.
*H04N 1/00* (2006.01)
*G06F 3/0481* (2013.01)

(52) U.S. Cl.
CPC ..... *H04N 1/00472* (2013.01); *G06F 3/04812* (2013.01); *H04N 1/00411* (2013.01); *H04N 1/00424* (2013.01); *H04N 1/00474* (2013.01); *H04N 1/00482* (2013.01); *H04N 1/00493* (2013.01)

(58) Field of Classification Search
CPC .......... H04N 1/00472; H04N 1/00411; H04N 1/00474; H04N 1/00482; H04N 1/00424; H04N 1/00493; G06F 3/04812
See application file for complete search history.

(56) References Cited

U.S. PATENT DOCUMENTS

| 5,621,904 A | * | 4/1997 | Elliott | ................... G06F 3/0481 715/798 |
| 5,805,167 A | * | 9/1998 | van Cruyningen | ... G06F 3/0482 715/808 |
| 6,025,841 A | * | 2/2000 | Finkelstein | ........... G06F 3/0481 715/803 |

(Continued)

FOREIGN PATENT DOCUMENTS

| JP | 2002244780 A | * | 8/2002 |
| JP | 2010-039656 A | | 2/2010 |
| JP | 2018-109813 A | | 7/2018 |

*Primary Examiner* — Justin R. Blaufeld
(74) *Attorney, Agent, or Firm* — IP Business Solutions, LLC

(57) ABSTRACT

A display apparatus includes a display device and a control device. The control device functions as a controller that displays a plurality of items on a screen of the display device, specifies a display region of an item on a basis of a position of the item on the screen of the display device for each of the plurality of items when the controller displays a pop-up window associated with a first item that is one of the plurality of items on the screen of the display device, detects a free region in which the pop-up window does not overlap display regions of all the items on the screen of the display device, which is close to the first item, and displays the pop-up window in the free region.

13 Claims, 18 Drawing Sheets

(56) References Cited

U.S. PATENT DOCUMENTS

| | | | | |
|---|---|---|---|---|
| 6,826,729 | B1* | 11/2004 | Giesen | G06F 3/0481 |
| | | | | 715/808 |
| 9,639,302 | B2* | 5/2017 | Sueishi | G06F 3/1253 |
| 2004/0064498 | A1* | 4/2004 | Imanishi | A63F 13/22 |
| | | | | 709/201 |
| 2004/0189710 | A1* | 9/2004 | Goulden | G06Q 30/02 |
| | | | | 715/790 |
| 2004/0261037 | A1* | 12/2004 | Ording | G06F 3/0481 |
| | | | | 715/788 |
| 2007/0008338 | A1* | 1/2007 | Kim | G09G 5/14 |
| | | | | 345/629 |
| 2007/0279485 | A1* | 12/2007 | Ohba | G06F 3/017 |
| | | | | 348/41 |
| 2009/0210820 | A1* | 8/2009 | Adachi | G06F 3/0481 |
| | | | | 715/786 |
| 2010/0088623 | A1* | 4/2010 | Ichino | G06F 3/0481 |
| | | | | 715/766 |
| 2010/0125806 | A1* | 5/2010 | Igeta | G06F 3/0486 |
| | | | | 715/770 |
| 2011/0252346 | A1* | 10/2011 | Chaudhri | G06F 3/04812 |
| | | | | 715/765 |
| 2012/0019861 | A1* | 1/2012 | Okada | G06K 15/4075 |
| | | | | 358/1.15 |
| 2012/0072867 | A1* | 3/2012 | Schlegel | G06F 3/0481 |
| | | | | 715/808 |
| 2014/0118781 | A1* | 5/2014 | Kobayashi | G06F 3/0486 |
| | | | | 358/1.15 |
| 2015/0199092 | A1* | 7/2015 | Kuscher | G09G 5/14 |
| | | | | 715/788 |
| 2016/0291747 | A1* | 10/2016 | Fischer | G06F 3/0488 |
| 2017/0038921 | A1* | 2/2017 | Ishida | H04N 1/00196 |
| 2017/0329465 | A1* | 11/2017 | Hong | G06F 3/04886 |
| 2018/0183954 | A1* | 6/2018 | Endo | H04N 1/00411 |

* cited by examiner

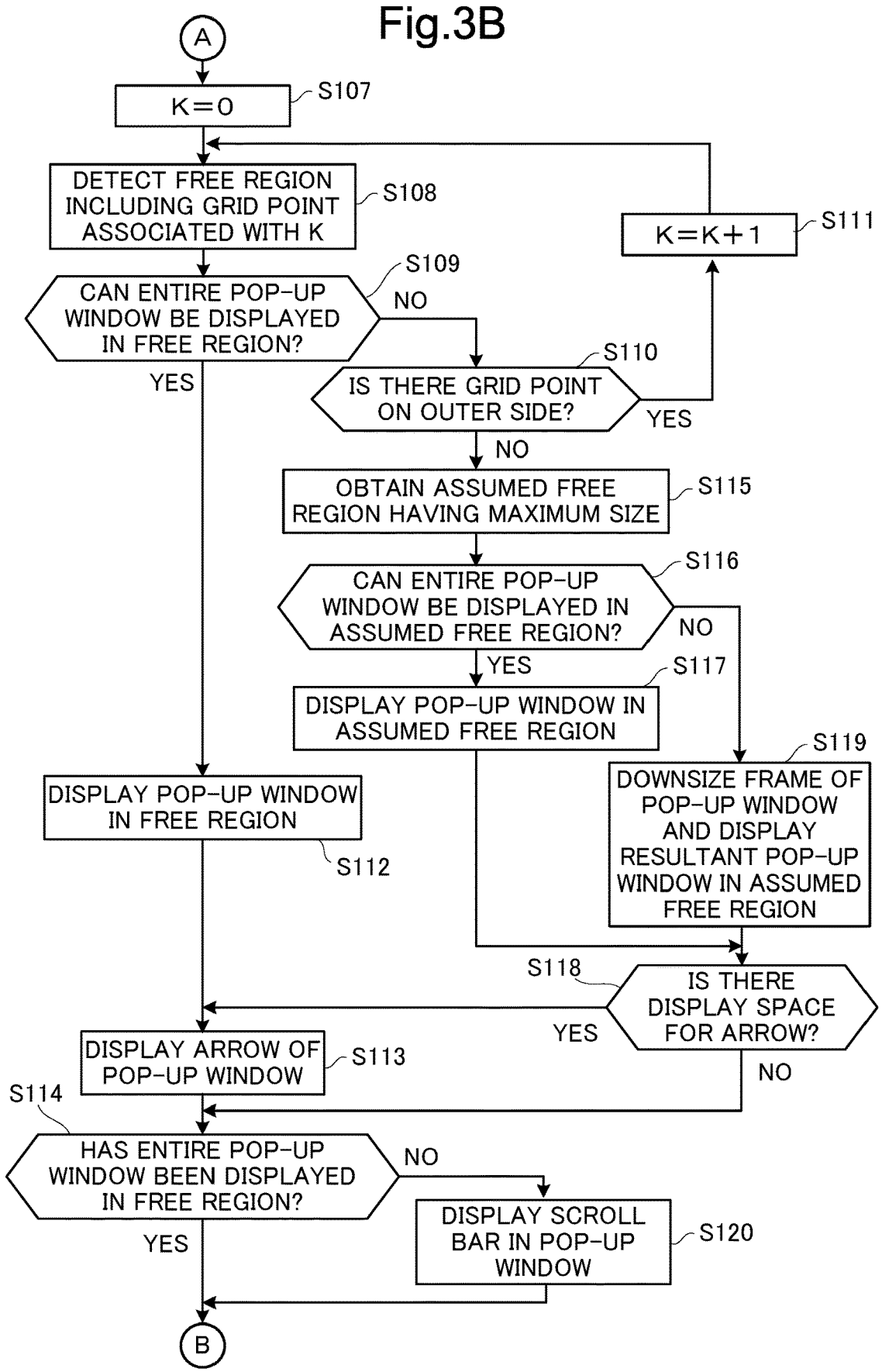

Fig.5

| IDENTIFIER OF ITEM | COORDINATES OF ITEM | SIZE OF ITEM | PRIORITY OF ITEM | DISPLAY LIMIT TIME OF ITEM | IDENTIFIER OF POP-UP |
|---|---|---|---|---|---|
| 0025 | X25,Y25 | M×M | A | – | 0125 |
| 0026 | X26,Y26 | M×M | D | – | 0126 |
| 0027 | X27,Y27 | M×M | A | 20 | 0127 |
| 0028 | X28,Y28 | S×S | B | – | 0128 |
| 0029 | X29,Y29 | S×S | A | – | 0129 |
| 0030 | X30,Y30 | L×M | C | 10 | 0130 |
| 0031 | X31,Y31 | L×L | D | – | 0131 |

DT

DISPLAY APPARATUS FOR DISPLAYING POP-UP WINDOW AT APPROPRIATE DISPLAY POSITION ON SCREEN OF DISPLAY DEVICE, AND COMPUTER-READABLE NON-TRANSITORY RECORDING MEDIUM STORING DISPLAY CONTROL PROGRAM

INCORPORATION BY REFERENCE

This application claims priority to Japanese Patent Application No. 2019-001325 filed on 8 Jan. 2019, the entire contents of which are incorporated by reference herein.

BACKGROUND

The present disclosure relates to a display apparatus and a computer-readable non-transitory recording medium that stores a display control program, and more particularly, to a technology for displaying a pop-up window on a screen of a display device.

A display apparatus displays a plurality of items such as soft keys or icons on the screen of a display device, detects a touch operation with respect to the items through a touch panel, and receives an instruction to execute a process corresponding to the touched item. Further, the display apparatus may display a pop-up window on the screen of the display device in response to a touch operation with respect to the item.

For example, a display apparatus that detects an operation position of a user on a display device, displays all menus corresponding to the detected operation position at a position according to the operation position on the display device, and displays a balloon pointing to the operation position is known as a first general technology. Further, a display apparatus that displays characters in a free region in a screen of a display device according to an operation of a user is known as a second general technology.

SUMMARY

As an aspect of the present disclosure, a technology obtained by further improving the above technology is proposed.

A display apparatus according to an aspect of the present disclosure includes a display device, and a control device. The control device includes a processor, and functions as a controller displaying a plurality of items on a screen of the display device, specifying a display region of an item on a basis of a position of the item on the screen of the display device for each of the plurality of items when the controller displays a pop-up window associated with a first item, the first item being one of the plurality of items, on the screen of the display device, detecting a free region in which the pop-up window does not overlap display regions of all the items on the screen of the display device, the free region being close to the first item, and displaying the pop-up window in the free region, by the processor executing a display control program.

A computer-readable non-transitory recording medium according to another aspect of the present disclosure stores a display control program, the display control program causing a computer including a display device and a processor to function as a controller displaying a plurality of items on a screen of the display device, specifying a display region of an item on the basis of a position of the item on the screen of the display device for each of the plurality of items when the controller displays a pop-up window associated with a first item, the first item being one of the plurality of items, on the screen of the display device, detecting a free region in which the pop-up window does not overlap display regions of all the items on the screen of the display device, the free region being close to the first item, and displaying the pop-up window in the free region, by the processor executing the display control program.

BRIEF DESCRIPTION OF THE DRAWINGS

FIG. 3B is a flowchart illustrating a processing procedure subsequent to FIG. 3A.

FIG. 5 is a diagram conceptually illustrating a data table in which display information of items in the GUI is stored.

DETAILED DESCRIPTION

Hereinafter, an embodiment of the present disclosure will be described with reference to the drawings.

Figure 1:
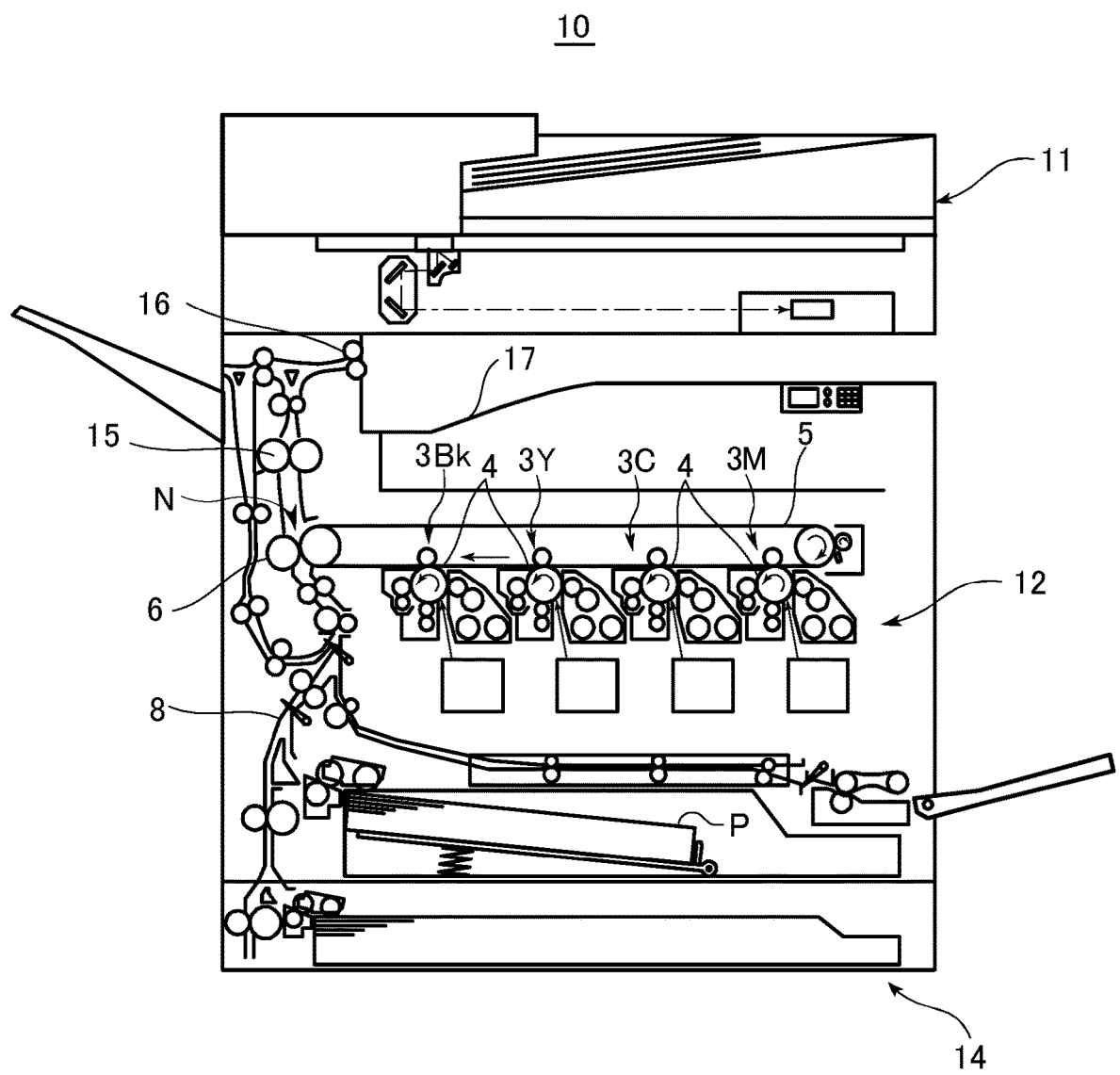
FIG. 1 is a cross-sectional view illustrating an image forming apparatus to which a display apparatus according to an embodiment of the present disclosure is applied.

FIG. 1 is a cross-sectional view illustrating an image forming apparatus to which a display apparatus according to an embodiment of the present disclosure has been applied. The image forming apparatus 10 includes an image reading device 11 and an image forming device 12.

The image reading device 11 includes an image sensor that optically reads an image of a document. The image reading device 11 converts an analog output of the image sensor into a digital signal to generate image data indicating an image of the document.

The image forming device 12 forms the image of the document on recording paper. The image forming device 12 includes a magenta image forming device 3M, a cyan image forming device 3C, a yellow image forming device 3Y, and a black image forming device 3Bk. In any of the image forming devices 3M, 3C, 3Y, and 3Bk, a surface of a photosensitive drum 4 is uniformly charged, the surface of the photosensitive drum 4 is exposed, an electrostatic latent image is formed on the surface of the photosensitive drum 4, the electrostatic latent image on the surface of the photosensitive drum 4 is developed into a toner image, and the toner image on the surface of the photosensitive drum 4 is primarily transferred to an intermediate transfer belt 5. Accordingly, a color toner image is formed on the intermediate transfer belt 5. The color toner image is secondarily transferred to recording paper P conveyed from a paper supply device 14 through a conveyance path 8 in a nip region N between the intermediate transfer belt 5 and a secondary transfer roller 6.

After the secondary transfer, the recording paper P is heated and pressed by a fixing device 15, the toner image on the recording paper P is fixed through thermocompression bonding, and the recording paper P is discharged to a discharge tray 17 through a discharge roller 16.

Figure 2:
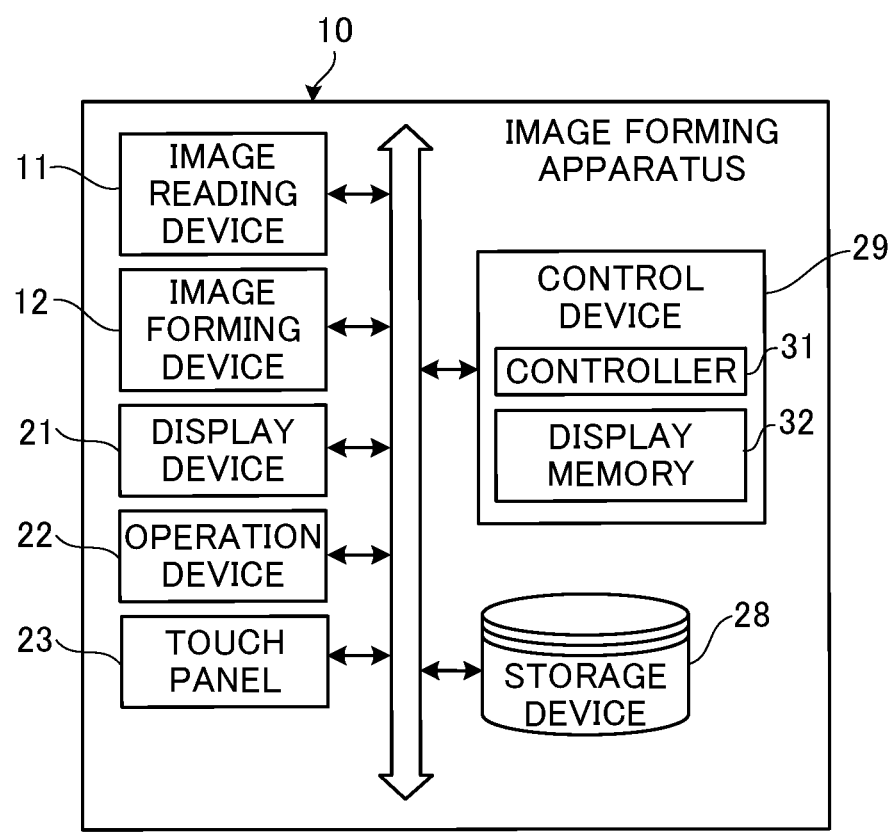
FIG. 2 is a block diagram illustrating a main configuration of the image forming apparatus.

FIG. 2 is a block diagram illustrating a main internal configuration of the image forming apparatus 10. As illustrated in FIG. 2, the image forming apparatus 10 includes the image reading device 11, the image forming device 12, a display device 21, an operation device 22, a touch panel 23, a storage device 28, and a control device 29. These components are configured to be able to transmit and receive data or signals through a bus.

The display device 21 includes a liquid crystal display (LCD), an organic EL (OLED: organic light-emitting diode) display, or the like. The operation device 22 includes physical keys such as a numeric keypad, an enter key, and a start key.

The touch panel 23 is disposed on a screen of the display device 21. The touch panel 23 is a touch panel of a resistive film type, a capacitance type, or the like. The touch panel 23 detects contact (touch) with the touch panel 23 of a finger of a user or the like, together with a contact position, and outputs a detection signal indicating coordinates of the contact position to, for example, a controller 31 of the control device 29 to be described below.

The storage device 28 is a large-capacity storage device such as a solid state drive (SSD) or a hard disk drive (HDD), and stores various application programs and various pieces of data.

The storage device 28 also stores a text image for displaying an image of text indicating characters as an item on the display device 21, and a soft key image for displaying an instruction reception key (a soft key) used for reception of an instruction from the user as an item on the display device 21.

The storage device 28 further stores, as display information of the item, an identifier of the item, coordinates (a display position) of the item on the screen of the display device 21, a size of the item, a priority of the item, a display limit time of the item, an identifier of a pop-up window associated with the item, and the like for each item, in addition to the text image (in the case of text) or the soft key image (in the case of the soft key), for each text or soft key.

The control device 29 includes a processor, a random access memory (RAM), a read only memory (ROM), and the like. The processor is, for example, a central processing unit (CPU), an application specific integrated circuit (ASIC), or a micro processing unit (MPU). The control device 29 functions as the controller 31 by a control program stored in the ROM or the storage device 28 being executed by the processor.

The control device 29 generally controls the image forming apparatus 10. The control device 29 is connected to the image reading device 11, the image forming device 12, the display device 21, the operation device 22, the touch panel 23, the storage device 28, and the like, and performs control of an operation of these components and transmission and reception of signals or data to and from each component.

The controller 31 serves as a processor that executes, for example, various processes necessary for image formation in the image forming apparatus 10. The controller 31 receives an operation instruction input by the user on the basis of a detection signal output from the touch panel 23 or an operation with respect to a physical key of the operation device 22. The controller 31 has a function of using a RAM of the control device 29 as a display memory 32, developing an image such as a graphical user interface (GUI) on the display memory 32, and displaying the developed image on the display device 21.

In the image forming apparatus 10 configured as described above, the user operates the GUI displayed on the screen of the display device 21 by the controller 31 through the touch panel 23 when the user instructs execution of a job such as copying. This GUI includes a plurality of items such as soft keys. The controller 31 detects a touch operation with respect to an item included in the GUI through the touch panel 23, receives an instruction to execute a process corresponding to the touched item, and executes a process indicated by the received execution instruction.

The controller 31 also displays a pop-up window on the screen of the display device 21 in response to the touch operation with respect to the item. At this point, the controller 31 performs a process of selecting an appropriate display position of the pop-up window on the screen of the display device 21, and displays the pop-up window at the selected display position.

Figure 3A:
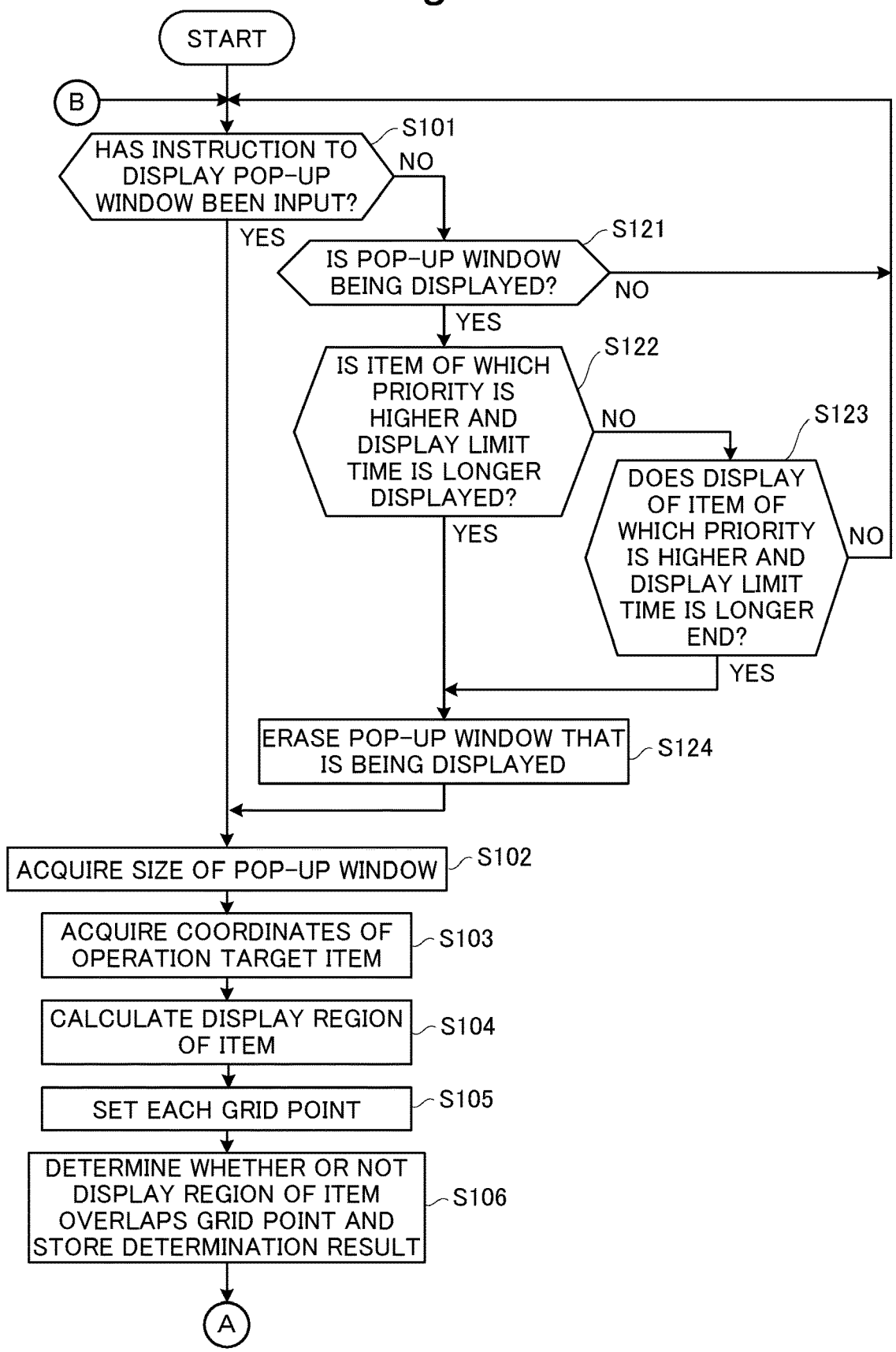
FIG. 3A is a flowchart illustrating a processing procedure for displaying a pop-up window at an appropriate display position on a screen of a display device.

Next, a processing procedure for displaying the pop-up window at an appropriate display position on the screen of the display device 21 will be described in detail with reference to flowcharts illustrated in FIGS. 3A and 3B.

Figure 4:
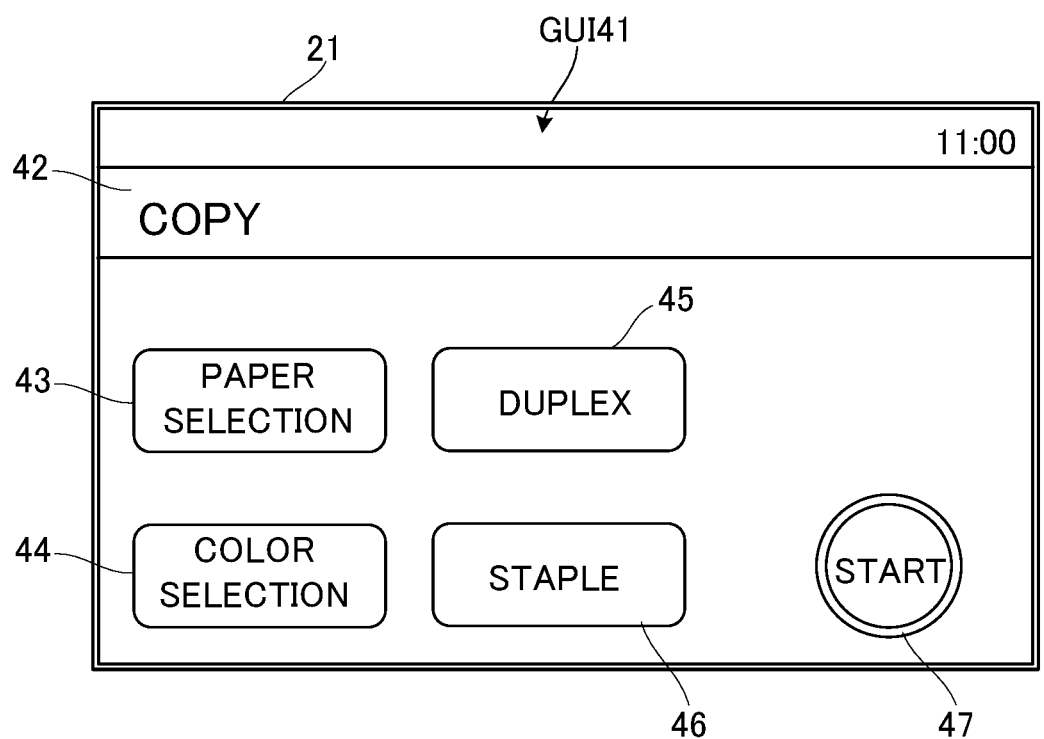
FIG. 4 is a diagram illustrating a GUI displayed on the screen of the display device.

It is assumed that the controller 31 has displayed a GUI 41 as illustrated in FIG. 4 on the screen of the display device 21. The controller 31 displays text 42 and five soft keys 43 to 47 as items on the GUI 41 illustrated in FIG. 4. The controller 31 reads a text image corresponding to the text 42 and soft key images corresponding to the five soft keys 43 to 47 from the storage device 28, develops image data (for example, a bitmap) of the GUI 41 into the display memory 32 using these, and displays the GUI 41 including the text 42 and the five soft keys 43 to 47 indicated by the image data in the display memory 32 on the screen of the display device 21.

In the storage device 28, the display information is stored, for example, as a data table DT as illustrated in FIG. 5 for each item. The controller 31 displays the items on the screen of the display device 21 according to coordinates and a size indicated by the display information relevant to the items. The controller 31 also displays the items on the screen of the display device 21 during the display limit time of the items and then hides the items. The controller 31 may not set the display limit time and may set a display time to be unlimited (when the display limit time of the item is not shown in FIG. 5, this means unlimited). Further, when the controller 31 displays a plurality of items so that the items overlap each other, the controller 31 displays the item having a higher priority so that the item overlaps an item having a lower priority, and displays all the items having a higher priority so that the items are hidden by items having a lower priority (FIG. 5 illustrates that A to D have a higher priority in this order). The item includes a pop-up window, in addition to the text and the soft keys as described above. For the pop-up window, display information is also stored in the storage device 28. For the pop-up window, a size and a priority are set in the display information of the pop-up window, but coordinates are not set.

It is assumed that, in a state in which the GUI 41 is displayed on the screen of the display device 21, the user inputs an instruction to display a pop-up window associated with a desired item through the touch panel 23 through a touch operation with respect to the desired item. When the controller 31 receives an instruction to display the item through the touch panel 23, the controller 31 further determines whether or not an instruction to display a pop-up window of the item has been input (step S101). Hereinafter, the touched item is referred to as an operation target item.

The controller 31 stores an identifier of each operation target item in the storage device 28, and when the controller 31 determines that the instruction to display a pop-up window has been input ("Yes" in step S101), the controller 31 reads and acquires a size of the pop-up window associated with the operation target item from the data table DT on the basis of the identifier of the operation target item (step S102). Further, the controller 31 reads and acquires coordinates of the operation target item from the data table DT (step S103).

Figure 6:
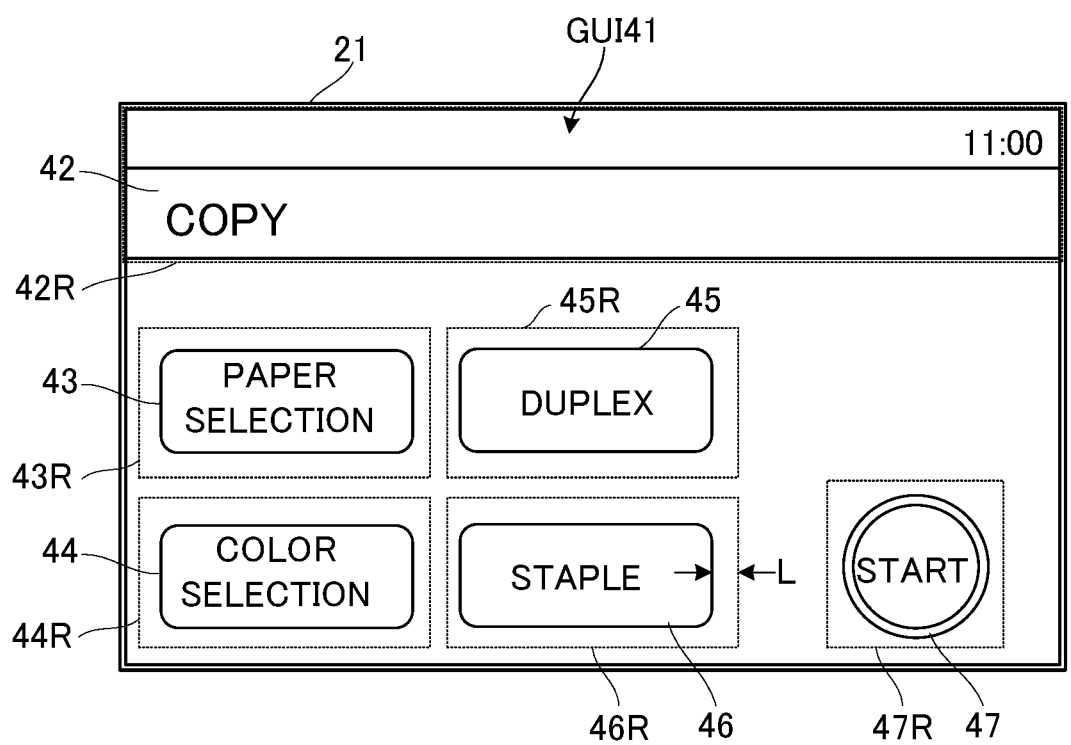
FIG. 6 is a diagram illustrating a display region of items on the screen of the display device.

Further, the controller 31 reads the coordinates and sizes of the text and the respective soft keys (the text 42 and the respective soft keys 43 to 47 in FIG. 6) displayed on the display screen of the display device 2 from the data table DT, and specifies display regions 42R and 43R to 47R of the respective items on the screen of the display device 21 on the basis of the respective coordinates and sizes (step S104). The sizes indicate the sizes of the display regions of the items. For example, the display region is (i) a rectangular region including only an item, or (ii) a rectangular region including an item and a margin of a defined width from an outer periphery of the item. Here, the defined width is a width corresponding to a predetermined shortest length of an arrow image to be described below, which is displayed between the pop-up window and an item associated with the pop-up window.

Figure 7:
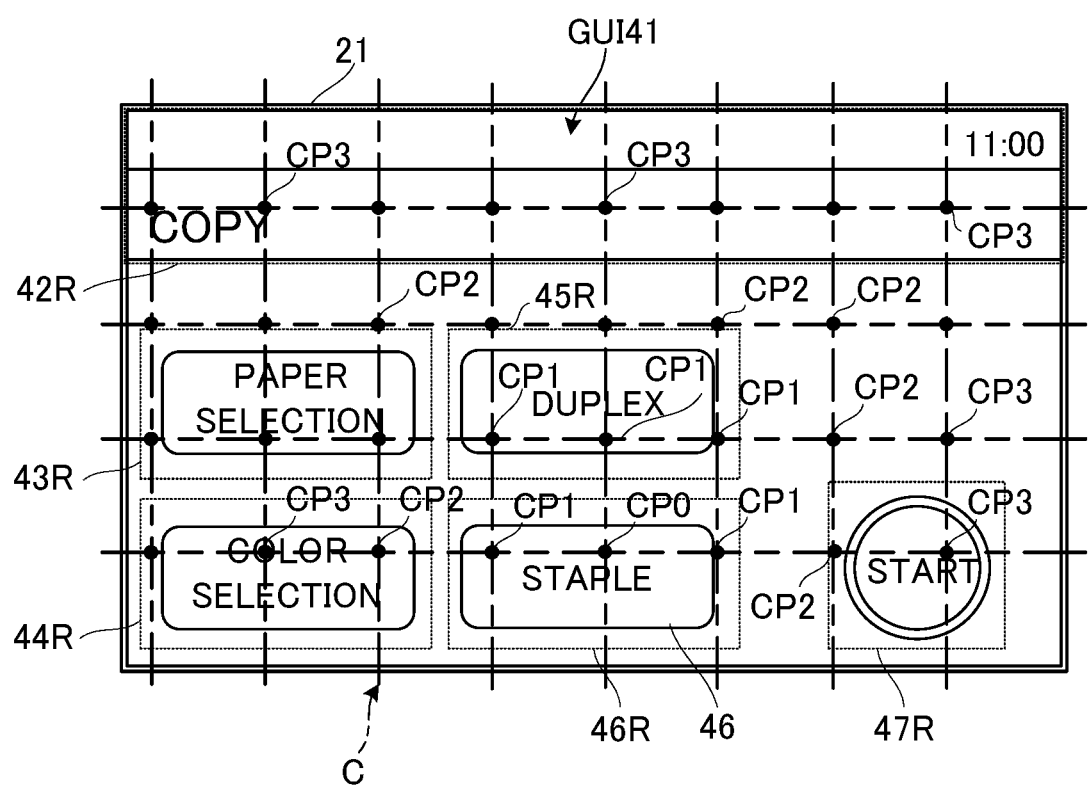
FIG. 7 is a diagram illustrating a virtual grid set on the screen of the display device.

At this point in time, the controller 31 sets a virtual grid C and grid points CP0 to CP3 thereof that partition the display screen displayed on the display device 21 into a plurality of regions virtually on the image showing the display screen, as illustrated in FIG. 7 (step S105). On the basis of the display regions 42R and 43R to 47R specified in step S104 and coordinates of the grid points CP0 to CP3 of the virtual grid C set in step S105, the controller 31 determines whether or not the display region of the item overlaps the grid point for each of the grid points CP0 to CP3, and stores a determination result in the storage device 28 (step S106).

Then, the controller 31 selects the grid point CP0 closest to a center (a center position; the same applies below) of the operation target item on the basis of the coordinates of the operation target item and the coordinates of the grid points CP0 to CP3 of the virtual grid C set in step S105, initially sets an index K to 0, and associates the index K=0 with the grid point CP0 closest to the center of the operation target item (step S107). The controller 31 determines whether or not the grid point CP0 associated with the index K=0 overlaps the display region of the item on the basis of the determination result in step S106, and detects a region including the grid point CP0 that does not overlap the display region of the item as a free region when the grid point CP0 does not overlap the display region of the item (step S108).

However, in the example illustrated in FIG. 7, since the grid point CP0 associated with the index K=0 overlaps the display region 46R of the soft key 46 of the operation target item, there is no free region including the grid point CP0, and the controller 31 does not detect the free region. Hereinafter, a case in which there is no free region including the grid point CP0 will be described as an example.

In this case, since the controller 31 has not detected the free region, the controller 31 determines that there is no free region in which an entire of the pop-up window can be displayed ("No" in step S109). When the controller 31 has determined that there is no free region including the grid point CP0 as described above, the controller 31 determines whether or not there is another grid point on the outer side from the grid point CP0 associated with the index K=0 (step S110). When there are the respective other grid points CP1 directly on the outer side from the grid point CP0 ("Yes" in step S110), the controller 31 sets the index K to 1 and associates the index K=1 with each grid point CP1 (step S111). The controller 31 determines whether or not the respective grid points CP1 associated with the index K=1 overlaps the display region of the item on the basis of the determination result in step S106, and detects a region including the grid point CP1 that does not overlap the display region of the item as a free region when the grid point CP1 does not overlap the display region of the item (step S108).

However, in the example illustrated in FIG. 7, since all the grid points CP1 associated with the index K=1 overlap the display region of the item, there is no free region including the grid point CP1, and the controller 31 does not detect the free region. Hereinafter, a case in which there is no free region including the grid point CP1 as described above will be described as an example. The controller 31 sequentially selects the grid points CP1 in a clockwise direction around the grid point CP0, and sequentially determines whether or not the respective selected grid points CP1 overlap the display region of the item.

In the above example, since the controller 31 has not detected the free region including the grid point CP1, the controller 31 determines that there is no free region in which the entire pop-up window can be displayed ("No" in step S109), and determines whether or not there is another grid point on the outer side from each grid point CP1 associated with the index K=1 (step S110). In the example illustrated in FIG. 7, there is another grid point CP2 directly on the outer side from the grid point CP1. Therefore, the controller 31 determines that there is the other grid point CP2 directly on the outer side from the grid point CP1 ("Yes" in step S110). The controller 31 sets the index K to 2 and associates the index K=2 with each grid point CP2 (step S111).

The controller 31 determines whether or not each grid point CP2 associated with the index K=2 overlaps the display region of the item on the basis of the determination result in step S106, and detects a nearby region of the grid point CP2 that does not overlap the display region of the item as a free region when the grid point CP2 does not overlap the display region of the item (step S108). In the example illustrated in FIG. 7, since some of the grid points CP2 associated with the index K=2 do not overlap the display region of the item, the controller 31 in this case detects nearby regions of the grid points CP2 that do not overlap the display region as free regions and calculates a size of each of the free regions. The controller 31 sequentially selects the grid points CP2 in the clockwise direction around the grid points CP1, and sequentially determines whether or not the respective selected grid points CP2 overlap the display region of the item.

For example, the controller 31 calculates a length LX (expressed as a number of pixels) in a horizontal direction to an edge of the display region of the item or the GUI through the grid point CP2 in the horizontal direction, and a length LY (expressed as a number of pixels) in a vertical direction to an edge of the display region of the item or the GUI through the grid point CP2 in the vertical direction on the basis of image data indicating the GUI (image data indicating the display screen) in the display memory 32, the respective display regions 42R and 43R to 47R specified in step S104, and the coordinates of the grid point CP2 calculated in step S105 (the grid point CP2 that does not overlap the display region). The controller 31 performs the calculation on each grid point CP2, and detects, as a free region BR1, a free region having a largest size in a free region defined by the length LX in the horizontal direction and the length LY in the vertical direction for each grid point CP2.

Figure 8A:
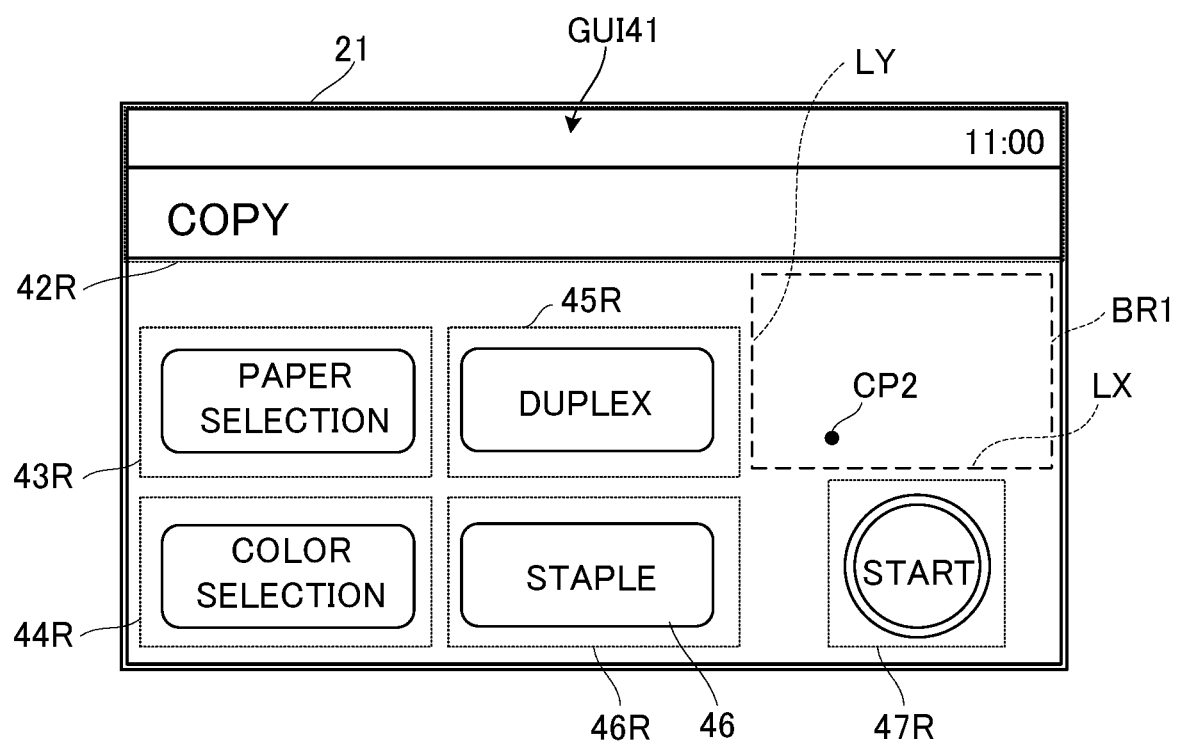
FIG. 8A is a diagram illustrating a free region in the GUI.
Figure 8B:
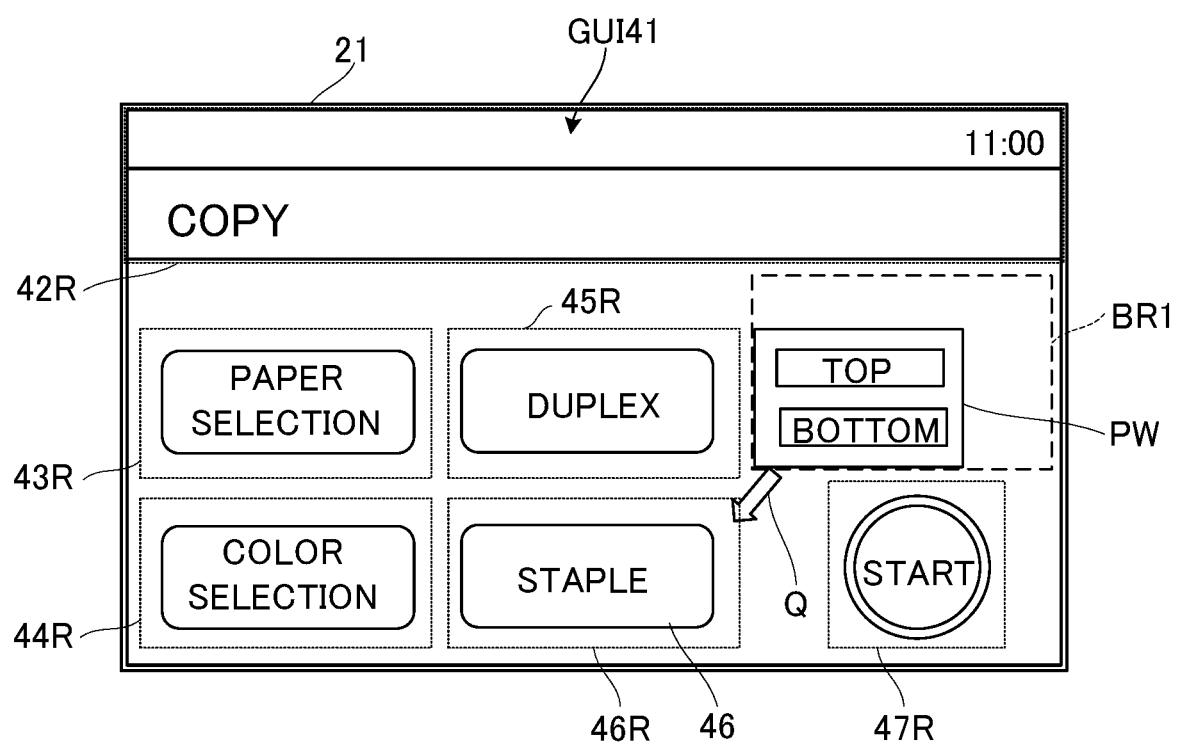
FIG. 8B is a diagram illustrating a state in which a pop-up window is displayed in the free region.

The controller 31 selects the free region BR1 having a maximum size including the grid point CP2 as illustrated in FIG. 8A. The controller 31 further determines whether or not the entire pop-up window can be displayed in the selected free region BR1 having a maximum size (step S109). When the controller 31 determines that the entire pop-up window can be displayed in the free region BR1 ("Yes" in step S109), the controller 31 positions and displays the pop-up window PW at a position at which a spacing distance between the pop-up window PW and the display region of the operation target item associated with the pop-up window PW is the shortest in the free region BR1 on the screen of the display device 21 as illustrated in FIG. 8B (step S112). That is, the controller 31 displays the pop-up window PW so that a center of the pop-up window is positioned at a position closest to the center of the operation target item in the free region BR1. The controller 31 displays an arrow image Q pointing in a direction from the pop-up window PW to the display region of the operation target item at a position between the pop-up window PW and the soft key 46 that is the operation target item (step S113). At this point, the controller 31 displays the arrow image having a length equal to or greater than a predetermined shortest length on a line connecting the center of the pop-up window PW to the center of the operation target item. The shortest length is not particularly limited as long as the shortest length is a shortest length at which association between the pop-up window and the operation target item can be visually recognized.

Further, the controller 31 determines whether or not the entire pop-up window has been displayed (step S114). Here, since the entire pop-up window has been displayed with the entire pop-up window fitted in the free region BR1, the controller 31 determines that the entire pop-up window has been displayed with the entire pop-up window fitted in the free region BR1 ("Yes" in step S114). Thereafter, the process returns to the process of step S101.

Thus, the grid points CP1, CP2, and CP3 on the outer side from the grid point CP0 closest to the center of the operation target item are sequentially selected, and the free region BR1 including the selected grid points is calculated when the selected grid points do not overlap the display region of the item. When the entire pop-up window can be displayed in the free region BR1, the pop-up window is displayed in the free region BR1. Thus, the pop-up window is displayed in the free region BR1 that is close to the operation target item and in which the entire pop-up window can be displayed.

Then, when the controller 31 has determined that there is no free region in which the entire pop-up window can be displayed ("No" in step S109), there is no other grid point on the outer side from the grid point ("No" in step S110), and accordingly, there is no free region BR1 in which the entire pop-up window can be displayed, the controller 31 selects each grid point (the grid point CP1 in this example) on the outermost side (at a position farthest from the center) in the display region 46R of the operation target item and obtains an assumed free region BR2 (step S115).

For example, the controller 31 selects the grid point CP1 on the outermost side in the display region 46R of the operation target item on the basis of the image data indicating the GUI in the display memory 32, the display regions 42R, and 43R to 47R specified in step S104, and the coordinates of the respective grid points CP1 to CP3 of the virtual grid C set in step S105, generates a rectangular region constituted by a candidate region to an edge of the display region of another item or the GUI through the selected grid point CP1 on the outermost side in a horizontal direction or a vertical direction (a region excluding the display regions of the other items), and the display region of the operation target item, and detects the generated rectangular region as the assumed free region BR2. When there is no candidate region, the controller 31 detects the display region of the operation target item itself as the assumed free region BR2. The controller 31 calculates a length LX (expressed as a number of pixels) in a horizontal direction of the assumed free region BR2, calculates a length LY (expressed as a number of pixels) in a vertical direction of the assumed free region BR2, and sets the length LX in the horizontal direction and the length LY in the vertical direction as a size of the assumed free region BR2. When the controller 31 has detected a plurality of assumed regions BR2, the controller 31 selects the assumed free region BR2 having a maximum size, and sets the free region BR2 having a maximum size as the assumed free region BR2 to be used in steps S116 and S117. That is, the assumed free region selected by the controller 31 is a region including the display region of the item associated with the pop-up window and excluding the display regions of other items.

The controller 31 determines whether or not the entire pop-up window can be displayed in the assumed free region BR2 (step S116). When the controller 31 determines that the entire pop-up window can be displayed ("Yes" in step S116), the controller 31 positions and displays the pop-up window at a position at which the entire pop-up window fits in the assumed free region BR2 on the screen of the display device 21, which is a position at which a range in which the display region 46R of the operation target item is hidden by the pop-up window is minimized (step S117). That is, the controller 31 displays the pop-up window so that the center of the pop-up window is positioned at a position farthest from the center of the operation target item in the assumed free region BR2. The controller 31 determines whether or not there is a free region for displaying an arrow image in the display region 46R of the operation target item (step S118).

When the controller 31 determines that there is a free region ("Yes" in step S118), the controller 31 displays the arrow image pointing to the soft key 46 of the operation target item from the pop-up window in the free region (step S113).

Figure 9A:
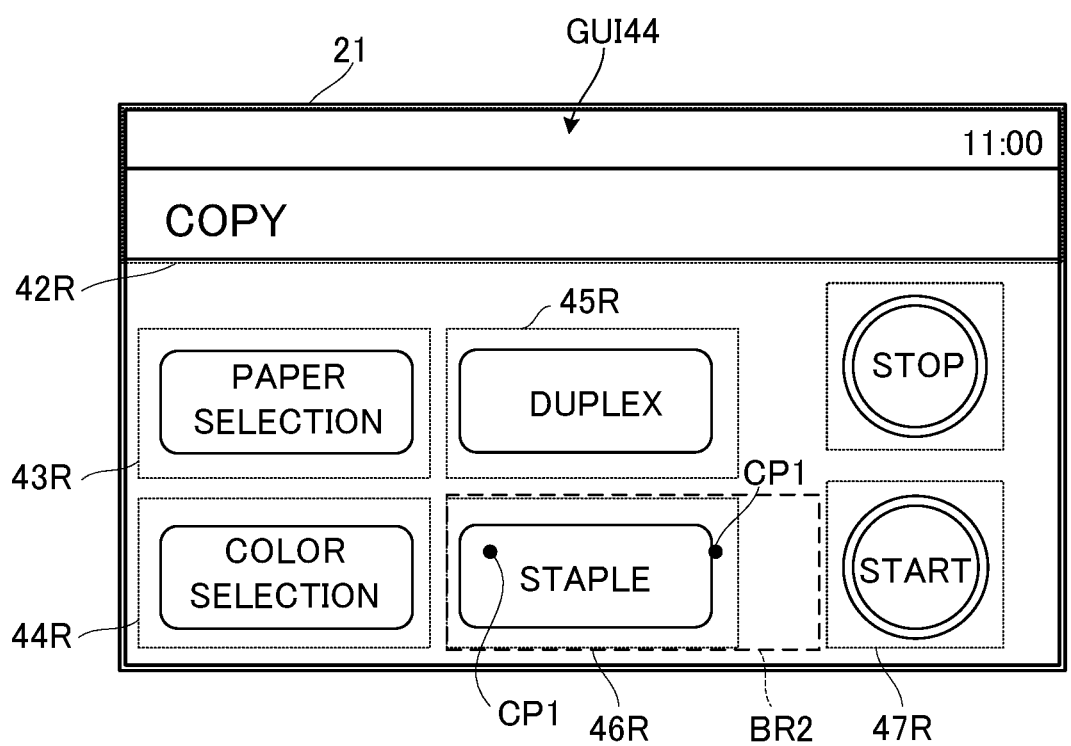
FIG. 9A is a diagram illustrating an assumed free region in the GUI.
Figure 9B:
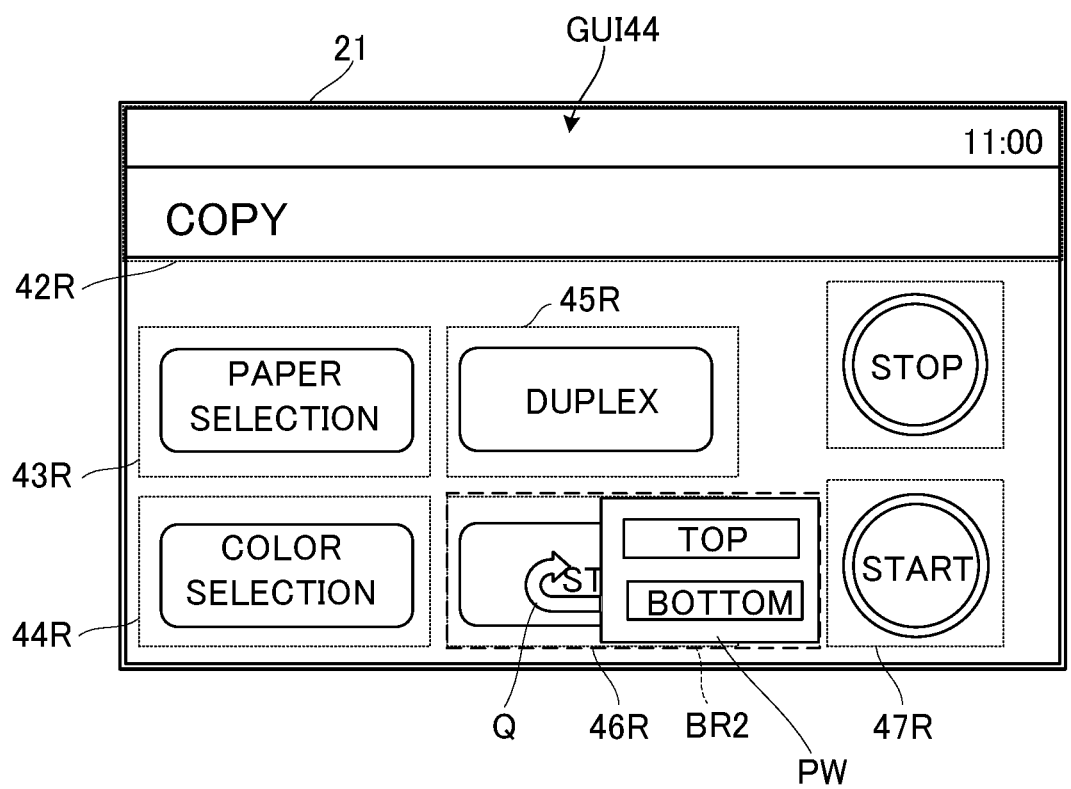
FIG. 9B is a diagram illustrating a state in which a pop-up window is displayed in the assumed free region.

For example, the controller 31 detects the assumed free region BR2 constituted by the display region 46R of the soft key 46, which is the operation target item, and an adjacent free region to the right side of the display region 46R in the GUI 44 as illustrated in FIG. 9A. The controller 31 displays the pop-up window PW at the position at which the entire pop-up window PW fits in the assumed free region BR2, which is a position at which the range in which the display region 46R of the operation target item is hidden by the pop-up window PW is minimized, and further displays the arrow image Q pointing to the soft key 46 of the operation target item from the pop-up window PW, as illustrated in FIG. 9B. Thus, the controller 31 displays the arrow image Q so that the arrow image Q is next to the pop-up window PW and overlaps the display region 46R.

Further, when the controller 31 determines that there is no free region for displaying the arrow image Q in the display region 46R of the operation target item ("No" in step S118), the controller 31 does not perform the process of step S113 and does not display the arrow image Q.

Figure 10:
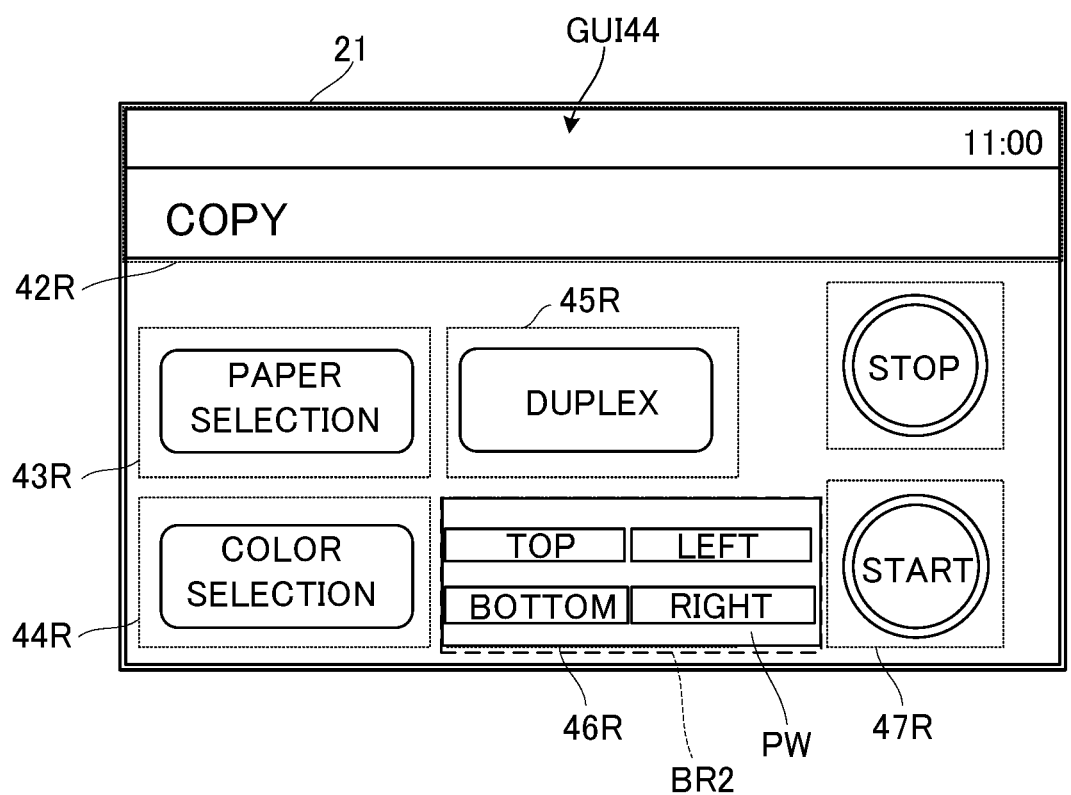
FIG. 10 is a diagram illustrating a state in which an overlapping pop-up window is displayed in an entire of the assumed free region in the GUI.

For example, the assumed free region BR2 constituted by the display region 46R of the soft key 46, which is the operation target item, and an adjacent free region to the right side of the display region 46R is detected in the GUI 44 as illustrated in FIG. 10, but the pop-up window PW is displayed so that the pop-up window PW overlaps the entire assumed free region BR2, and there is no free region for displaying the arrow image Q in the display region 46R of the operation target item. Accordingly, the controller 31 does not display the arrow image Q.

Thereafter, the controller 31 determines whether or not the entire pop-up window PW has been displayed in the assumed free region BR2 (step S114). When the controller 31 determines that the entire pop-up window PW has been displayed in the assumed free region BR2 ("Yes" in step S114), the controller 31 returns to the process of step S101.

Further, when the controller 31 determines that the entire pop-up window PW is unable to be displayed in the assumed free region BR2 ("No" in step S116), the controller 31 downsizes a frame of the pop-up window PW to a size allowing the pop-up window PW to fit in the assumed free region BR2 on the screen of the display device 21 and displays the pop-up window PW in the assumed free region BR2 (step S119). The controller 31 determines whether or not there is a free region for displaying the arrow image Q in the display region 46R of the operation target item (step S118). When the controller 31 determines that there is the free region ("Yes" in step S118), the controller 31 displays the arrow image Q pointing to the soft key 46 of the operation target item from the pop-up window PW in the free region (step S113). Further, when the controller 31 determines that there is no free region for displaying the arrow image Q in the display region 46R of the operation target item ("No" in step S118), the controller 31 does not perform the process of step S113 and does not display the arrow image Q.

The controller 31 determines whether or not the entire pop-up window PW has been displayed in the assumed free region BR2 (step S114). Here, since the controller 31 downsizes and displays the frame of the pop-up window PW in step S119, the controller 31 determines that the entire pop-up window PW is not displayed in the assumed free region BR2 ("No" in step S114), displays a scroll bar SB for allowing display content of the pop-up window PW to be displayed in a scrolling manner in the pop-up window PW such that a scroll display can be performed (step S120). The controller 31 returns to the process of step S101.

Figure 11:
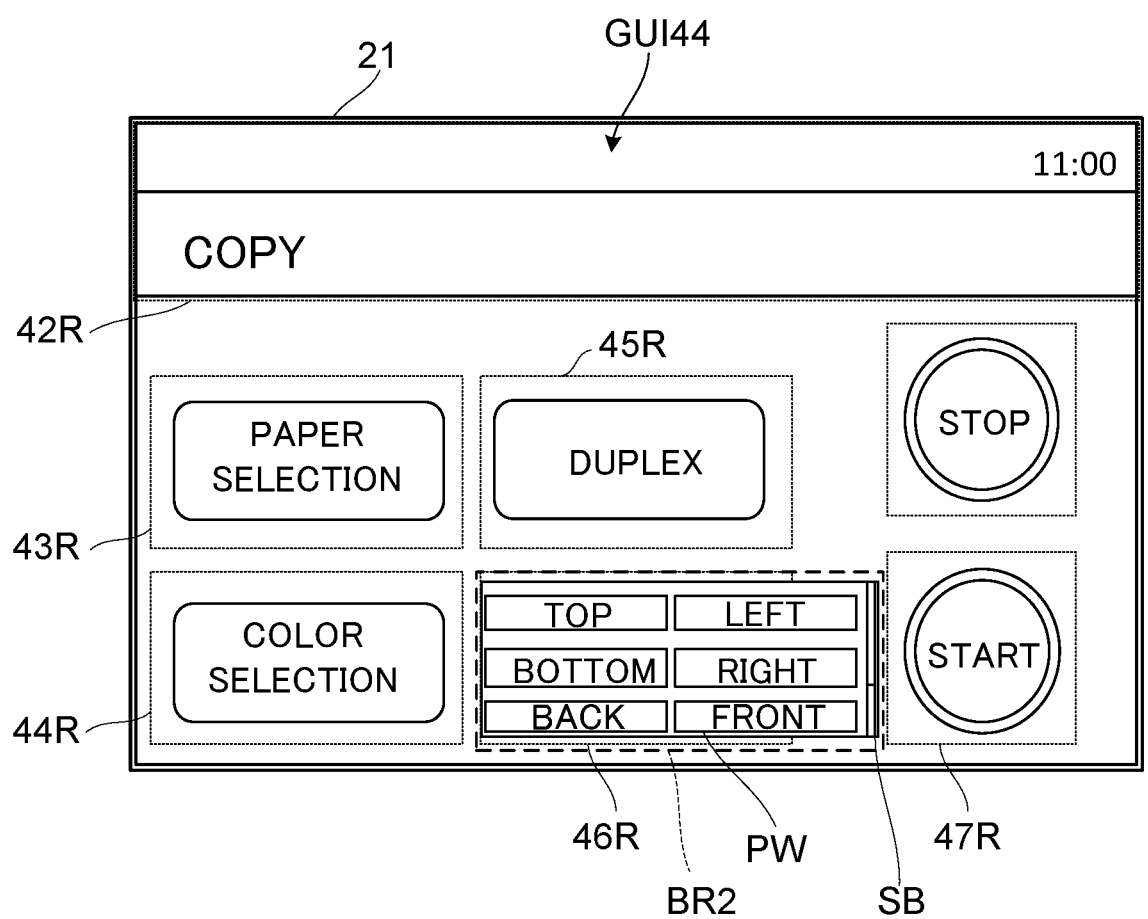
FIG. 11 is a diagram illustrating a state in which an overlapping pop-up window having a scroll bar is displayed in the entire assumed free region in the GUI.

For example, since the assumed free region BR2 constituted by the display region 46R of the soft key 46, which is the operation target item, and an adjacent free region to the right side of the display region 46R is detected in the GUI 44 as illustrated in FIG. 11, and the frame of the pop-up window PW is downsized and displayed so that the pop-up window PW overlaps the entire assumed free region BR2, the scroll bar SB is displayed in the pop-up window PW. When the user performs a slide operation with respect to the scroll bar SB, the controller 31 detects the slide operation with respect to the scroll bar SB through the touch panel 23, and displays display content of the pop-up window PW in a scrolling manner according to the slide operation.

On the other hand, when the controller 31 determines whether or not the display of the pop-up window as described above has been instructed (step S101), the controller 31 determines whether or not the pop-up window has already been displayed on the screen of the display device 21 (step S121).

For example, when the display of the pop-up window has not been instructed ("No" in step S101) and the pop-up window has not yet been displayed on the screen of the display device 21 ("No" in step S121), the controller 31 repeats steps S101 and S121. When the display of the pop-up window has been instructed ("Yes" in step S101), the controller 31 performs step S102 described above and subsequent processes.

Further, when the controller 31 has determined that the pop-up window has already been displayed on the screen of the display device 21 ("Yes" in step S121), the controller 31 performs a process of determining whether or not an item of which the priority is higher than that of the pop-up window and the display limit time is equal to or greater than a predetermined threshold value has been displayed on the screen of the display device 21 (step S122) and a process of determining whether or not the display of the item has ended (step S123) by referring to the data table DT illustrated in FIG. 5.

The pop-up window already displayed on the screen of the display device 21 is displayed through a process subsequent to step S101 "Yes" and step S102, and the display thereof is continued. In this state, when the controller 31 displays the item of which the priority is higher than that of the pop-up window and the display limit time is equal to or greater than the threshold value, the controller 31 displays the item in preference to the pop-up window at the coordinates associated with the item in the data table DT during the display limit time. At this point, since the controller 31 displays the item so that the item overlaps the pop-up window, the pop-up window is likely to be difficult to view.

Therefore, when the controller 31 determines that the controller 31 displays the item of which the priority is higher than that of the pop-up window and the display limit time is equal to or greater than the threshold value from now on ("Yes" in step S122), the controller 31 displays the item, temporarily erases the pop-up window (step S124), performs a process subsequent to step S102 on the pop-up window again, sets display positions of the pop-up window and the arrow image again, and displays the pop-up window and the arrow image. Accordingly, the display positions of the pop-up window and the arrow image are changed to positions at which visual recognition of the item is not hindered and displayed, while the item is displayed at the coordinates associated with the item during the display limit time.

Figure 12A:
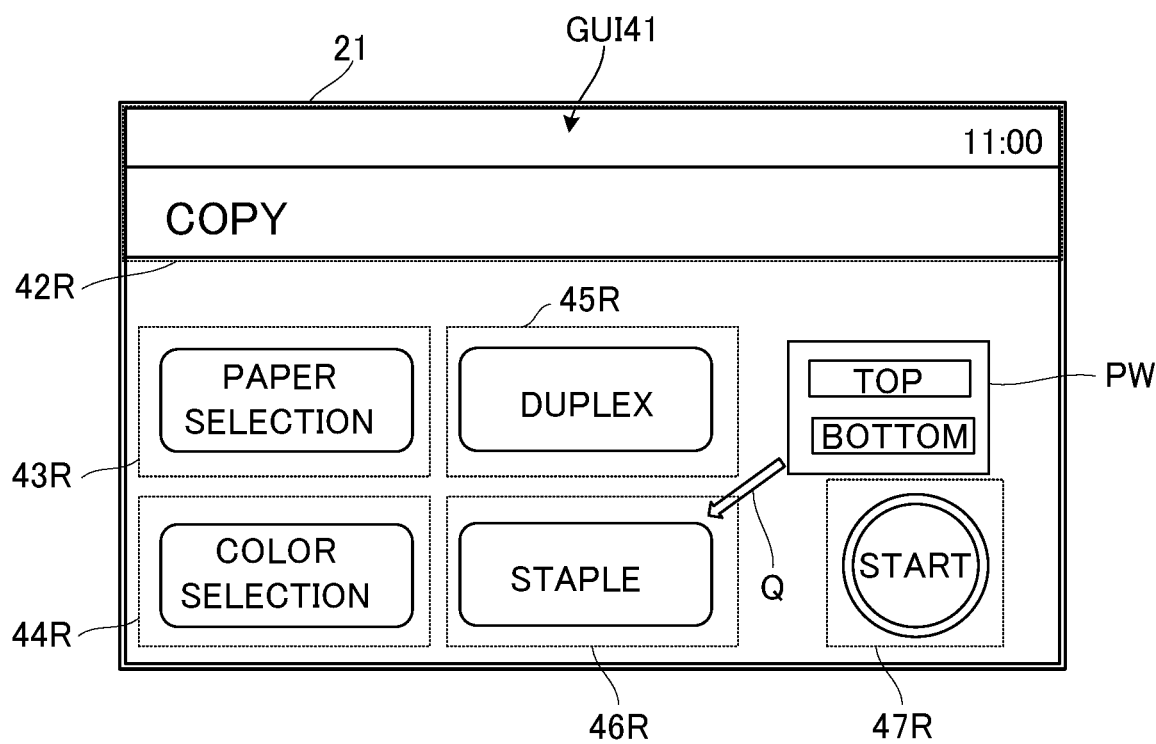
FIG. 12A is a diagram illustrating a state in which a pop-up window is displayed.
Figure 12B:
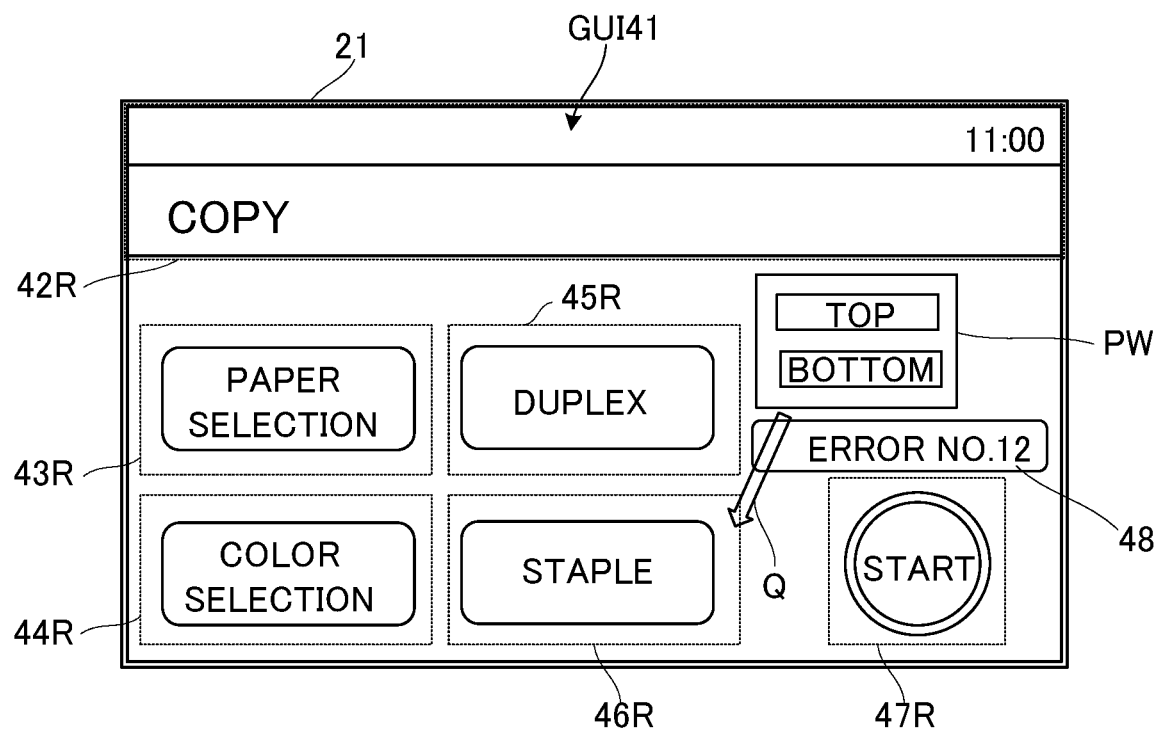
FIG. 12B is a diagram illustrating a state in which a pop-up window and an item of which a priority is higher than that of the pop-up window and a display limit time is equal to or greater than a threshold value are displayed.

For example, when a display of an item 48 of which the priority is higher than that of the pop-up window PW and the display limit time is equal to or greater than the threshold value is started in a state in which the pop-up window PW and the arrow image Q have been displayed as illustrated in FIG. 12A, the pop-up window PW and the arrow image Q are temporarily erased, and the pop-up window PW and the arrow image Q are displayed at appropriate changed positions as illustrated in FIG. 12B. Here, since the arrow image Q overlaps the item 48, the controller 31 displays a part of the arrow image Q overlapping the item 48 translucently.

Further, even when the controller 31 displays the item of which the priority is higher than that of the pop-up window and the display limit time is equal to or greater than the threshold value and has determined that the display of the item is to end ("Yes" in step S123), the controller 31 temporarily erases the pop-up window (step S124), repeats the processes subsequent to step S102 on the pop-up window again, and sets and updates the display positions of the pop-up window and the arrow again. Accordingly, the item is erased and, at the same time, the pop-up window and the arrow return to the original positions and are displayed.

For example, when the controller 31 has ended the display of the item 48 to hide the item 48 in a state in which the controller 31 displays the item 48 of which the priority is higher than that of the pop-up window PW and the display limit time is equal to or greater than the threshold value, and also displays the pop-up window PW and the arrow image Q as illustrated in FIG. 12B, the controller 31 causes the pop-up window PW and the arrow image Q to return to the original positions and to be displayed as illustrated in FIG. 12A.

Further, when the pop-up window has been displayed on the screen of the display device 21 ("Yes" in step S121), and the controller 31 determines that an item of which the priority is lower than that of the pop-up window or the display limit time is smaller than the threshold value is displayed ("No" in step S122) or determines that the display of the item of which the priority is higher than that of the pop-up window and the display limit time is equal to or greater than the threshold value has not ended ("No" in step S123), the controller 31 continues the display of the pop-up window without erasing the pop-up window and repeating the processes subsequent to step S102 for the pop-up window again.

Figure 13A:
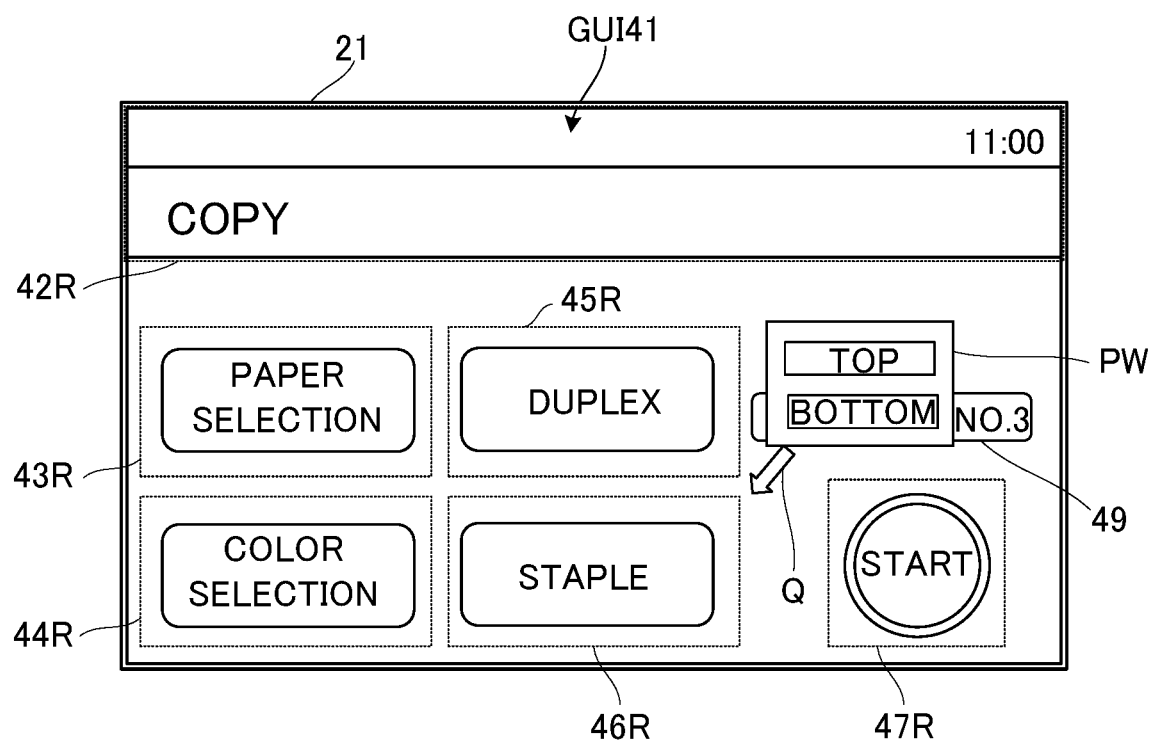
FIG. 13A is a diagram illustrating a state in which a pop-up window and an item of which a priority is lower than that of the pop-up window are displayed.
Figure 13B:
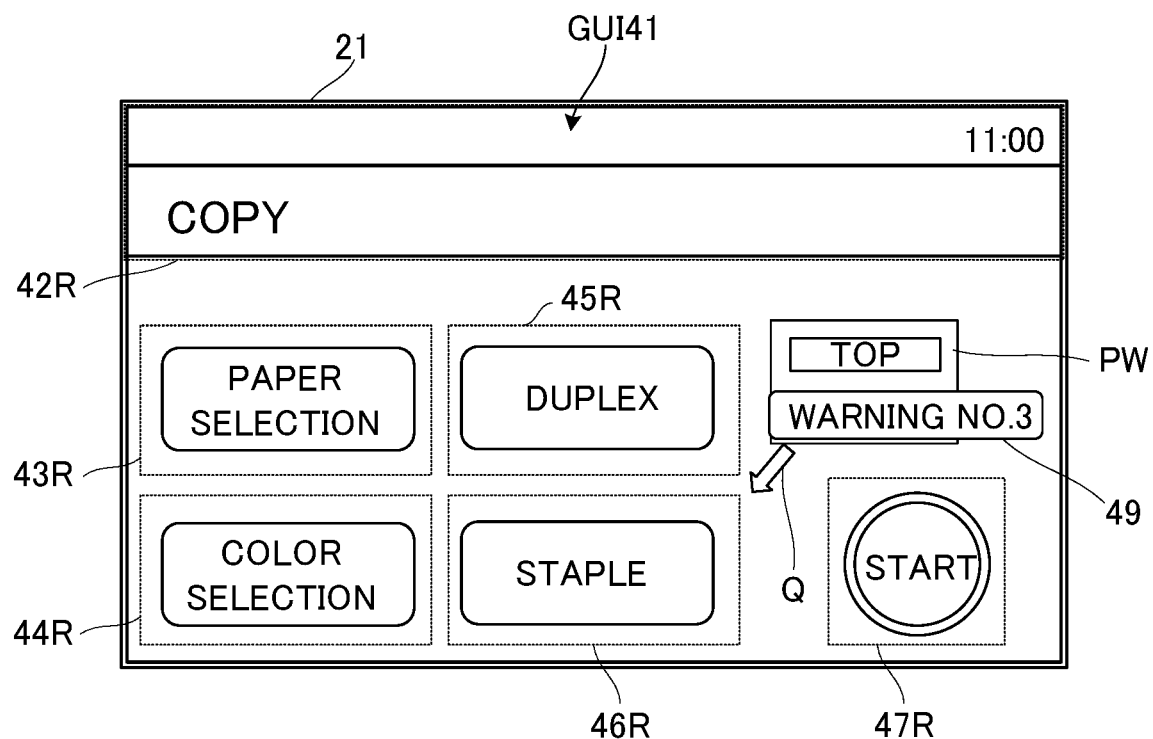
FIG. 13B is a diagram illustrating a state in which a pop-up window and an item of which a display limit time is smaller than the threshold value are displayed.

For example, when an item 49 having a lower priority than the pop-up window PW has been displayed as illustrated in FIG. 13A, the item 49 is displayed so that the item 49 overlaps the pop-up window PW beneath the pop-up window PW. Therefore, it is not difficult for the pop-up window PW to be viewed. Alternatively, when the item 49 of which the display limit time is smaller than the threshold value has been displayed as illustrated in FIG. 13B, the item 49 is displayed so that the item 49 overlaps the pop-up window PW on the pop-up window PW. However, when the display limit time smaller than the threshold value elapses from the start of the display of the item 49, the item 49 is erased. Therefore, a time in which it is difficult for the pop-up window PW to be viewed is short.

Incidentally, in the case of the first general technology described above, the display apparatus displays all the menus at the position according to the operation position on the display device. Therefore, it is necessary for the user to select the operation position accurately, and there is a problem in that the selection of the operation position is troublesome for the user. Further, in the second general technology described above, the display apparatus displays the characters in the free region in the screen of the display device, but how to select an appropriate free region when the free region is narrow or a plurality of free regions are scattered is not taken into consideration.

On the other hand, in the embodiment, an appropriate display position at which the pop-up window on the screen of the display device 21 is easily visually recognized is selected, and the pop-up window is displayed at the selected display position. Therefore, it is possible to save time and effort of the user required for the selection of the operation position and to display the pop-up window at the appropriate display position. Further, an appropriate display position of the arrow image Q showing association between the pop-up window and the item on the screen of the display device 21 can be selected, and the arrow image Q can be displayed at the selected display position. Further, when display content (a position and size of each item) on the screen is the same, the pop-up window can always be displayed at the same position and with the same size.

Although the image forming apparatus 10 has been described as an example in the embodiment, the display apparatus of the present disclosure can be applied to other types of electronic devices.

Further, a display method described in the embodiment can be provided as a display control program stored in the ROM or the storage device 28 described above. This display control program is recorded on a computer-readable non-transitory recording medium, such as a hard disk, a CD-ROM, a DVD-ROM, or a semiconductor memory. In this case, the computer-readable non-transitory recording medium having the display control program recorded thereon is an embodiment of the present disclosure.

Further, the configuration and processes of the embodiment described with reference to FIGS. 1 to 13B are merely examples of the present disclosure, and are not intended to limit the present disclosure to the configuration and processes.

While the present disclosure has been described in detail with reference to the embodiments thereof, it would be apparent to those skilled in the art the various changes and modifications may be made therein within the scope defined by the appended claims.

What is claimed is:
1. A display apparatus comprising:
a display device; and
a control device including a processor, the control device functioning as a controller displaying a plurality of items on a screen of the display device, specifying a display region for each item of the plurality of items on a basis of a position of each item when the controller displays a pop-up window associated with a first item of the plurality of items, on the screen of the display device, detecting a first free region which is closest to the first item among all free regions in which the pop-up window does not overlap display regions of all the items on the screen of the display device, and displaying the pop-up window in the first free region, by the processor executing a display control program,
wherein the controller
detects a second free region which is closest to the first item among all free regions in which the pop-up window does not overlap display regions of all items including a second item different from the plurality of items on the screen of the display device, and displays the pop-up window in the second free region when the controller displays the second item on the screen of the display device, and detects a first assumed free region including a display region of the first item and excluding display regions of all other items, which are different from the first item, including the second item in the screen of the display device and displays the pop-up window in the first assumed free region when the controller is unable to detect the second free region.

2. The display apparatus according to claim 1, wherein the controller displays, on the screen of the display device, an arrow image between the pop-up window and the first item when the controller displays the pop-up window in the first free region.

3. The display apparatus according to claim 2, wherein the controller specifies, as the display region of the item, a region including the item and a margin of a width corresponding to a length of the arrow image from an outer periphery of the item.

4. The display apparatus according to claim 1, wherein, when the controller is unable to detect the first free region, the controller detects a second assumed free region including a display region of the first item and excluding display regions of other items different from the first item in the screen of the display device, and displays the pop-up window in the second assumed free region.

5. The display apparatus according to claim 4, wherein the controller displays an arrow image on the screen of the display device so that the arrow image is next to the pop-up window and overlaps the display region of the first item when the controller displays the pop-up window in the second assumed free region.

6. The display apparatus according to claim 4, wherein, when an entire of the pop-up window is unable to be displayed in the second assumed free region, the controller downsizes the pop-up window and displays the downsized pop-up window in the second assumed free region.

7. The display apparatus according to claim 6, wherein the controller downsizes the pop-up window and displays the downsized pop-up window in the second assumed free region, and displays a scroll bar for allowing display content of the pop-up window to be scrolled in the second assumed free region.

8. The display apparatus according to claim 1, wherein the controller maintains a display position of the pop-up window in a case in which the controller displays the second item on the screen of the display device when the popup window has been displayed, and a display time of the second item is less than a preset threshold value.

9. The display apparatus according to claim 8, wherein, when the display of the second item ends, the controller specifies a display region for each item of all items other than the second item on a basis of the position of each item on the screen of the display device, detects the first free region which is closest to the first item among all free regions in which the pop-up window does not overlap display regions of all the items on the screen of the display device, and displays the pop-up window in the first free region again, and when the controller is unable to detect the first free region, the controller detects a second assumed free region including the display region of the first item and excluding display regions of all the other items other than the second item on the screen of the display device, and displays the pop-up window in the second assumed free region again.

10. The display apparatus according to claim 9, wherein the controller displays, when the controller displays the pop-up window in a first region, where the pop-up window overlaps the display region of the first item, in the first assumed free region, the pop-up window on the screen of the display device at a position farthest from a center of the first item among all positions in the first region, displays, when the controller displays the pop-up window in the second region, where the pop-up window does not overlap the display region of the first item, in the first assumed free region, the pop-up window on the screen of the display device at a position closest to the center of the first item among all positions in the second region, and displays, on the screen of the display device, an arrow image having a predetermined minimum length or more on a line connecting a center of the pop-up window to the center of the first item.

11. The display apparatus according to claim 1, wherein the controller displays, on the screen of the display device, an arrow image between the pop-up window and the first item, and displays the arrow image translucently when the arrow image overlaps the second item.

12. The display apparatus according to claim 1, wherein the controller maintains the display position of the pop-up window in a case in which the controller displays the second item on the screen of the display device when the pop-up window has been displayed, and a priority of the second item is lower than that of the pop-up window.

13. A computer-readable non-transitory recording medium storing a display control program, the display control program causing a computer including a display device and a processor to function as a controller displaying a plurality of items on a screen of the display device, specifying a display region for each item of the plurality of items on a basis of a position of each item when the controller displays a pop-up window associated with a first item of the plurality of items, on the screen of the display device, detecting a first free region which is closest to the first item among all free regions in which the pop-up window does not overlap display regions of all the items on the screen of the display device, and displaying the pop-up window in the first free region, by the processor executing the display control program, wherein the controller detects a second free region which is closest to the first item among all free regions in which the pop-up window does not overlap display regions of all items including a second item different from the plurality of items on the screen of the display device, and displays the pop-up window in the second free region when the controller displays the second item on the screen of the display device, and detects a first assumed free region including a display region of the first item and excluding display regions of all other items, which are different from the first item, including the second item in the screen of the display device and displays the pop-up window in the first assumed free region when the controller is unable to detect the second free region.

\* \* \* \* \*